Patented Dec. 11, 1951

2,578,290

UNITED STATES PATENT OFFICE 2,578,290

MONOAZO COMPOUNDS CONTAINING A 4,6-DIHYDROXYPYRIMIDINE NUCLEUS

Joseph B. Dickey, Rochester, N. Y., and James G. McNally, Kingsport, Tenn., assignors to Eastman Kodak Company, Rochester N. Y., a corporation of New Jersey No Drawing. Application January 13, 1948, Serial No. 2,124

1 Claim. (Cl. 260—154)

This invention relates to new monoazo heterocyclic compounds and their application to the art of dyeing or coloring. Textile materials made of or containing a cellulose alkyl carboxylic acid ester having two to four carbon atoms in the acid groups thereof can be colored fast yellow shades by direct dyeing procedures well-known in the art.

While the compounds of our invention will be illustrated more particularly in connection with the coloring of textile materials made of cellulose acetate, it will be understood that other hydrolyzed as well as unhydrolyzed alkyl carboxylic esters of cellulose of the aforesaid character including cellulose propionate, cellulose butyrate, cellulose acetate-butyrate, and cellulose acetate-propionate can be colored.

Our invention has for its object to provide new azo dyes useful for the coloration of textile materials made of or containing a cellulose alkyl carboxylic acid ester having two to four carbon atoms in the acid groups thereof. Another object of our invention is to provide dyeings on the aforesaid textile materials which are of good fastness to light and washing. A further object is to provide a satisfactory process for the preparation of the new azo dye compounds of our invention.

The new azo compounds by means of which the above objects are attained or made possible have the formula:

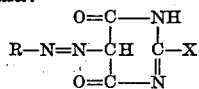

wherein R represents the residue of a non-sulfonated monocyclic aryl nucleus of the benzene series and X stands for a hydrogen atom, an alkyl group having one to four, inclusive, carbon atoms, a monohydroxyalkyl group having two to three, inclusive, carbon atoms, and an alkoxyalkyl group having three to four, inclusive, carbon atoms.

The azo compounds of our invention can be prepared by diazotizing a primary amine having the formula:

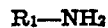

wherein $R_1$ stands for a non-sulfonated monocyclic benzene nucleus and reacting the diazonium compound formed in an alkaline aqueous medium with a 4,6-dihydroxypyrimidine compound having the formula:

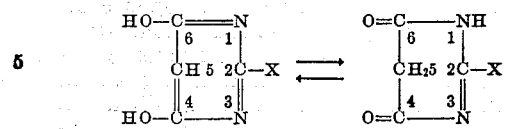

wherein X has the meaning previously assigned to it. A coupling reaction occurs whereby a benzene nucleus is joined to the 5-position of the pyrimidine nucleus through an azo linkage resulting in an azo compound having the formula given in the preceding paragraph. The reaction mixture is then acidified, and the precipitated dye compound is recovered by filtration.

The following examples illustrate the azo compounds of our invention and the manner in which they are prepared.

Example 1

13.7 grams of o-phenetidine are added to 150 cc. of water to which has been added 25 cc. of 36% hydrochloric acid. The resulting solution is cooled to a temperature approximating 0-5° C. by the addition of ice, and the o-phenetidine is diazotized while maintaining this temperature by adding, with stirring, 6.9 grams of sodium nitrite dissolved in water.

12.6 grams of 2-methyl-4,6-dihydroxypyrimidine are dissolved in 200 cc. of water containing 30 grams of sodium carbonate. The resulting solution is cooled to 0-10° C. by the addition of ice and the diazonium compound prepared as described above is slowly added with stirring. Upon completion of the coupling reaction which takes place the mixture is made acid to litmus by the addition of a mineral acid such as hydrochloric acid and the dye compound formed is recovered by filtration, washed with water, and dried. The dye compound obtained has the formula:

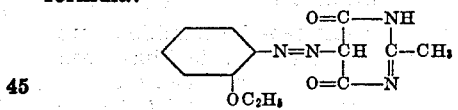

and colors cellulose acetate greenish-yellow shades.

By the use of 14.0 grams of 2-ethyl-4,6-dihydroxypyrimidine and 16.8 grams of 2-n-butyl- 4,6-dihydroxypyrimidine, respectively, in place of 2-methyl-4,6-dihydroxypyrimidine in the foregoing example

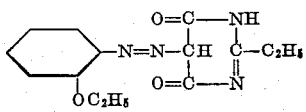

and

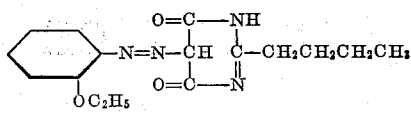

respectively, are obtained. Each of these dye compounds colors cellulose acetate greenish-yellow shades.

Example 2

16.8 grams of o-nitro-p-methoxyaniline are diazotized in accordance with the method described in Example 1 for the diazotization of o-phenetidine.

12.6 grams of 2-methyl-4,6-dihydroxypyrimidine are dissolved in 200 cc. of water containing 10 grams of sodium hydroxide. The resulting solution is cooled to a temperature of 0-10° C. by the addition of ice, and the diazo solution formed above is slowly added with stirring. Upon completion of the coupling reaction which takes place, the mixture is made acid to litmus by the addition of hydrochloric acid following which the precipitated dye is recovered by filtration, washed with water, and dried. The dye compound obtained has the formula:

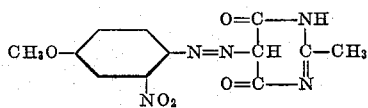

and colors cellulose acetate greenish-yellow shades.

Example 3

23.1 grams of 3-nitro-4-aminophenylmethylsulfonamide are added to 150 cc. of water containing 25 cc. of 36% hydrochloric acid. The resulting mixture is diazotized at 0-10° C. by adding a water solution of 6.9 grams of sodium nitrite.

12.6 grams of 2-methyl-4,6-dihydroxypyrimidine are dissolved in 200 cc. of water containing 30 grams of sodium carbonate. The resulting solution is cooled to 0-10° C., and the diazo solution prepared above is slowly added with stirring. A coupling reaction occurs at the completion of which the mixture is made acid to litmus by the addition of hydrochloric acid, and the precipitated dye compound is recovered by filtration, washed with water, and dried. The dye compound has the formula:

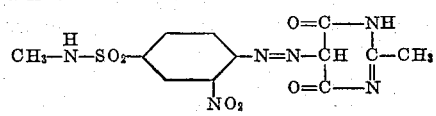

and colors cellulose acetate yellow shades.

Example 4

17.3 grams of o-nitro-p-chloroaniline are added to 150 cc. of water to which has been added 25 cc. of 36% hydrochloric acid, and the resulting mixture is diazotized at 0-10° C. in the usual manner by the addition of a water solution of 6.9 grams of sodium nitrite.

15.6 grams of 2-β-hydroxyethyl-4,6-dihydroxypyrimidine are dissolved in 200 cc. of water containing 30 grams of sodium carbonate. The resulting solution is cooled to 0-10° C., and the diazo solution formed above is slowly added with stirring. Upon completion of the coupling reaction which occurs, the mixture is made acid to litmus by the addition of hydrochloric acid, and the precipitated dye compound is recovered by filtration, washed with water, and dried. The dye compound has the formula:

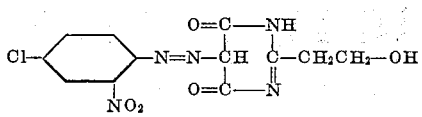

and colors cellulose acetate greenish-yellow shades.

Example 5

10.9 grams of o-aminophenol are added to 100 cc. of water containing 40 cc. of 36% hydrochloric acid. The resulting solution is cooled to 10° C. and diazotized at this temperature by adding, with stirring, a water solution of 6.9 grams of sodium nitrite.

11.2 grams of 4,6-dihydroxypyrimidine are dissolved in 200 cc. of water containing 30 grams of sodium carbonate. The resulting solution is cooled to a temperature of 0-10° C., and the diazo solution prepared as described above is slowly added, with stirring. When the coupling reaction is complete, the mixture is made acid to litmus with hydrochloric acid, and the precipitated dye compound is recovered by filtration, washed with water, and dried. The dye compound formed has the formula:

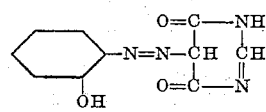

and colors cellulose acetate greenish-yellow shades.

Example 6

10.7 grams of o-toluidine are daizotized in known fashion and the diazonium mixture obtained is gradually added to 17.0 grams of 2-β-methoxyethyl-4,6-dihydroxypyrimidine dissolved in 200 cc. of water containing 30 grams of sodium carbonate. Upon completion of the coupling reaction which takes place, the mixture is made acid to litmus by the addition of hydrochloric acid and the precipitated dye compound is recovered by filtration, washed with water, and dried. The dye compound obtained has the formula:

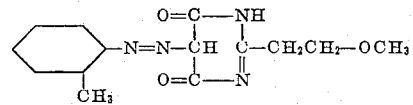

and colors cellulose acetate greenish-yellow shades.

Example 7

12.9 grams of o-chloroaniline are diazotized in known fashion and the diazonium mixture obtained is gradually added with stirring to 17.0 grams of 2-γ-hydroxypropyl-2,4-dihydroxypyrimidine dissolved in 200 cc. of water containing 30 grams of sodium carbonate. Upon completion of the coupling reaction, the mixture is made acid to litmus by the addition of hydrochloric acid, and the precipitated dye compound is recovered by filtration, washed with water, and dried. The dye compound formed has the formula:

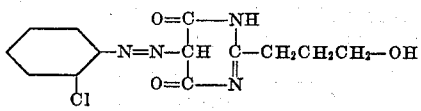

and colors cellulose acetate greenish-yellow shades.

Example 8

12.3 grams of o-anisidine are diazotized in known fashion and the resulting solution of diazonium compound is added slowly with stirring to an iced solution of 15.4 grams of 2-isopropyl-4,6-dihydroxypyrimidine dissolved in 200 cc. of water containing 30 grams of sodium carbonate. Upon completion of the coupling reaction which occurs the mixture is made acid to litmus by adding hydrochloric acid. The precipitate, which is recovered by filtration, washed with water, and dried, has the formula:

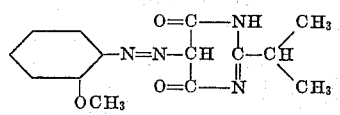

and colors cellulose acetate greenish-yellow shades.

By the use of 12.6 grams of 2-methyl-4,6-dihydroxypyrimidine and 16.8 grams of 2-n-butyl-4,6-dihydroxypyrimidine, respectively, in place of 2-isopropyl-4,6-dihydroxypyrimidine in the foregoing example

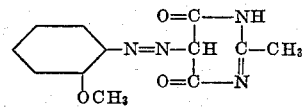

and

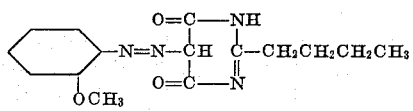

respectively, are obtained. Each of these dye compounds color cellulose acetate greenish-yellow shades.

Example 9

16.4 grams of o-nitro-p-cyanoaniline are diazotized in known fashion and the diazonium mixture obtained is added with stirring to 18.4 grams of 2-β-ethoxyethyl-4,6-dihydroxypyrimidine dissolved in 200 cc. of water containing 30 grams of sodium carbonate. Upon completion of the coupling reaction which takes place, the reaction mixture is made acid to litmus by the addition of hydrochloric acid. The product which precipitates is recovered by filtration, washed with water, and dried. The dye compound thus obtained has the formula:

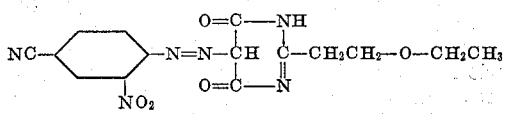

and colors cellulose acetate yellow shades.

Example 10

15.4 grams of o-nitro-p-hydroxyaniline are diazotized in known fashion and the diazonium compound obtained is gradually added with stirring to 14.0 grams of 2-ethyl-4,6-dihydroxypyrimidine dissolved in 200 cc. of water containing 30 grams of sodium carbonate. Upon completion of the coupling reaction which takes place, the mixture is made acid to litmus by the addition of hydrochloric acid, and the precipitated dye compound is recovered by filtration, washed with water, and dried. The dye compound thus obtained has the formula:

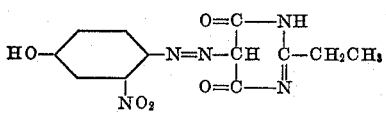

and colors cellulose acetate orange-yellow shades.

Example 11

13.8 grams of o-nitroaniline are diazotized in known fashion and the diazonium compound obtained is gradually added with stirring to 11.2 grams of 2,4-dihydroxypyrimidine dissolved in 200 cc. of water containing 30 grams of sodium carbonate. When the coupling reaction is complete, the mixture is made acid to litmus by adding hydrochloric acid, and the dye which precipitates is recovered by filtration, washed with water, and dried. The dye compound obtained has the formula:

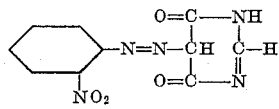

and colors cellulose acetate greenish-yellow shades.

Example 12

13.8 grams of p-nitroaniline are diazotized according to the procedure described in Example 1 for the diazotization of o-phenetidine. The resulting solution of diazonium compound is added slowly with stirring to a solution of 15.6 grams of 2-β-hydroxyethyl-4,6-dihydroxypyrimidine in 200 cc. of water containing 30 grams of sodium carbonate while maintaining a temperature of 0-10° C. Upon completion of the coupling reaction which takes place, the mixture is made acid to litmus by the addition of hydrochloric acid. At this point the precipitated dye compound is recovered by filtration, washed with water, and dried. The dye compound thus obtained has the formula:

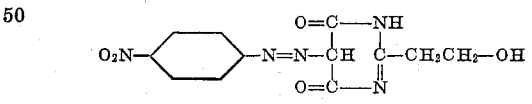

and colors cellulose acetate yellow shades.

Example 13

21.6 grams of 3-nitro-4-aminophenylmethyl sulfone are diazotized in known fashion and the diazonium compound obtained is gradually added with stirring to 11.2 grams of 4,6-dihydroxypyrimidine dissolved in 200 cc. of water containing 30 grams of sodium carbonate. When the coupling reaction which occurs is complete, the mixture is made acid to litmus by adding hydrochloric acid following which the precipitated dye compound is recovered by filtration, washed with water, and dried. The dye compound obtained has the formula:

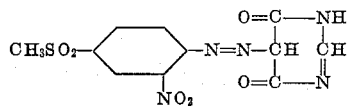

and colors cellulose acetate yellow shades.

Example 14

15.4 grams of p-nitro-o-hydroxyaniline are diazotized in known fashion and the diazonium compound obtained is gradually added with stirring to 17.0 grams of 2-β-hydroxypropyl-4,6-dihydroxypyrimidine dissolved in 200 cc. of water containing 30 grams of sodium carbonate. Upon completion of the coupling reaction which occurs, the mixture is made acid to litmus by adding hydrochloric acid. The dye which precipitates is recovered by filtration, washed with water and dried. The dye compound thus obtained has the formula:

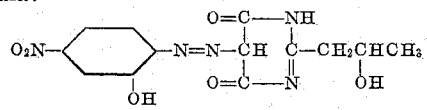

and colors cellulose acetate yellow shades.

Example 15

21.6 grams of 2-amino-5-nitrophenylmethyl-sulfone are diazotized in accordance with the procedure described in Example 1. The diazonium solution formed is added slowly with stirring to 11.2 grams of 4,6-dihydroxypyrimidine dissolved in 200 cc. of water containing 30 grams of sodium carbonate while maintaining a temperature of 0-10° C. When the coupling reaction which occurs is complete, the mixture is made acid to litmus with hydrochloric acid following which the precipitated dye compound is recovered by filtration, washed with water, and dried. The dye compound thus obtained has the formula:

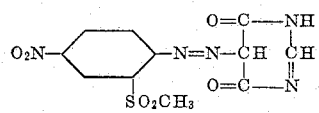

and colors cellulose acetate yellow shades.

Example 16

10.9 grams of p-aminophenol are added to 150 cc. of water to which has been added 25 cc. of 36% hydrochloric acid. The resulting solution is diazotized while maintaining a temperature of 0-10° C. by adding, with stirring, a water solution of 6.9 grams of sodium nitrite.

16.8 grams of 2-n-butyl-4,6-dihydroxy-pyrimidine are dissolved in a dilute aqueous sodium carbonate solution. The resulting solution is cooled to a temperature of 0-10° C. and the diazo solution prepared as described above is slowly added with stirring. Upon completion of the coupling reaction which takes place, the mixture is made acid to litmus with hydrochloric acid following which the precipitated dye compound is recovered by filtration, washed with water, and dried. The dye compound obtained has the formula:

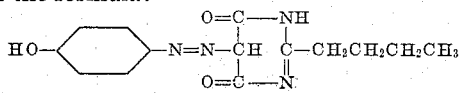

and colors cellulose acetate yellow shades.

Example 17

13.7 grams of o-phenetidine are diazotized as described in Example 1 and the diazonium solution obtained is added slowly with stirring to 11.2 grams of 4,6-dihydroxypyrimidine dissolved in 200 cc. of water containing 30 grams of sodium carbonate while maintaining a temperature of 0-10° C. Upon completion of the coupling reaction, the mixture is made acid to litmus with hydrochloric acid following which the precipitated dye compound is recovered by filtration, washed with water and dried. The dye compound thus obtained has the formula:

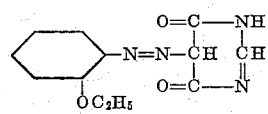

and colors cellulose acetate greenish-yellow shades.

By the use of 12.3 grams of o-anisidine in place of o-phenetidine in the foregoing example

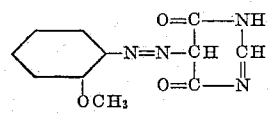

is obtained. It colors cellulose acetate greenish-yellow shades.

Example 18

13.7 grams of o-phenetidine are diazotized as described in Example 1 and the diazonium solution obtained is added slowly with stirring to a solution of 15.6 grams of 2-β-hydroxyethyl-4,6-dihydroxypyrimidine in 200 cc. of water containing 30 grams of sodium carbonate while maintaining a temperature of 0-10° C. Upon completion of the coupling reaction which takes place, the mixture is made acid to litmus by the addition of hydrochloric acid following which the precipitated dye compound is recovered by filtration, washed with water and dried. The dye compound thus obtained has the formula:

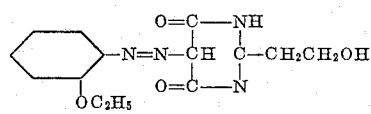

and colors cellulose acetate greenish-yellow shades. By the use of 17 grams of 2-β-hydroxypropyl-4,6-dihydroxypyrimidine in place of 2-β-hydroxyethyl-4,6-dihydroxypyrimidine in the foregoing example,

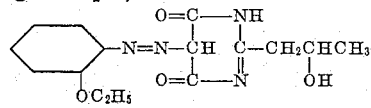

is obtained. It colors cellulose acetate greenish-yellow shades.

Example 19

12.3 grams of o-anisidine are diazotized in accordance with the procedure described in Example 1 and the diazonium solution obtained is added slowly, with stirring, to 17 grams of 2-β-methoxyethyl-4,6-dihydroxypyrimidine dissolved in 200 cc. of water containing 30 grams of sodium carbonate. Upon completion of the coupling reaction which takes place, the mixture is made acid to litmus by the addition of hydrochloric acid and the precipitated dye compound is recovered by filtration, washed with water and dried. The dye compound obtained has the formula:

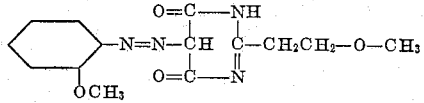

and colors cellulose acetate greenish-yellow shades.

By the use of 18.4 grams of 2-β-ethoxyethyl-4,6-dihydroxypyrimidine in place of 2-β-methoxyethyl-4,6-dihydroxypyrimidine in the foregoing example,

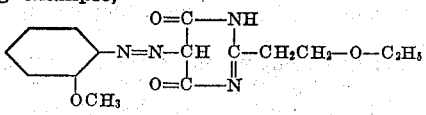

is obtained. It colors cellulose acetate greenish-yellow shades.

Following the procedures described hereinbefore, the following dye compounds of our invention are readily prepared.

Example 20

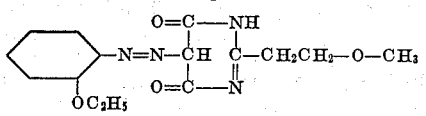

Example 21

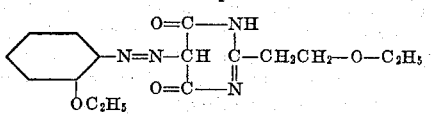

Example 22

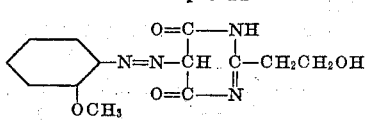

Example 23

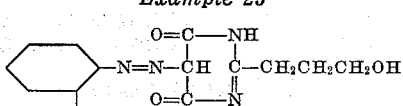

Each of the dye compounds colors cellulose acetate greenish-yellow shades.

The foregoing examples are intended to be illustrative and not limitative. Other valuable azo dye compounds within the scope of our invention are obtained by coupling any of the 4,6-dihydroxypyrimidine derivatives hereinbefore named with the diazonium form of other non-sulfonated monocyclic primary aromatic amines of the benzene series. Examples are the following: m-anisidine, p-anisidine, m-toluidine, p-toluidine, m-phenetidine, p-phenetidine, o-bromoaniline, m-bromoaniline, p-bromoaniline, m-chloroaniline, p-chloroaniline, o-$\beta$-hydroxyethoxyaniline, p-$\beta$-hydroxyethoxyaniline, o-methoxy-p-chloroaniline, o-chloro-p-methoxyaniline, o-methoxy-p-ethylaniline, o-methoxy-p-methylaniline, o-methyl-p-methoxyaniline, o-methyl-p-ethoxyaniline, o - methyl - p - nitroaniline, o-methyl-p-chloroaniline and o-chloro-p-methylaniline.

The preparation of the 4,6-dihydroxypyrimidine compounds which we employ as coupling compounds in manufacturing our new azo dyes follows the procedure described by Kenner et al. (J. Chem. Soc. 1943, 388) for the preparation of 4,6-dihydroxypyrimidine. According to this procedure diethyl malonate is added to a solution of formamidine hydrochloride and sodium ethoxide in ethanol. After the mixture has stood overnight the product which precipitates is recovered and dissolved in water. Upon acidification of the aqueous solution, 2,4-dihydroxypyrimidine is precipitated and recovered.

We have found that derivatives of 2,4-dihydroxypyrimidine which are substituted in the 2-position by certain alkyl, hydroxyalkyl, or alkoxyalkyl groups can be prepared by following the same procedure as described by Kenner et al. Several of these preparations are described hereinafter.

2-methyl-4,6-dihydroxypyrimidine 94.5 grams of acetamidine hydrochloride are added to an ice-cold solution of sodium ethoxide prepared by disolving 69 grams of sodium in one liter of absolute ethanol. After filtering the solution to remove the sodium chloride formed 160 grams of anhydrous diethyl malonate are added to the clear filtrate. The resulting reaction mixture is allowed to stand at room temperature in a closed vessel for 24 hours following which the solid reaction product which separates is collected on a suction filter. The solid is then dissolved in water and the solution formed is acidified by the addition of hydrochloric acid to precipitate 2-methyl-4,6-dihydroxypyrimidine which is then recovered by filtration, washed with a small amount of ice water and dried.

2-n-butyl-4,6-dihydroxypyrimidine 136.5 grams of valeramidine hydrochloride are reacted with sodium ethoxide prepared by adding 69 grams of sodium to one liter of absolute ethanol. Sodium chloride is formed and is removed by filtering the reaction mixture. To the clear filtrate are added 160 grams of anhydrous diethyl malonate. The reaction mixture is then heated under reflux for two hours and allowed to stand in a closed vessel overnight. A solid product precipitates which, after recovery on a suction filter, is dissolved in water. The resulting solution is acidified with hydrochloric acid, and 2-n-butyl-4,6-dihydroxypyrimidine which precipitates is recovered by filtration, washed with ice water, and dried.

2-$\beta$-hydroxyethyl-4,6-dihydroxypyrimidine 124.5 grams of $\beta$-hydroxypropionamidine hydrochloride are added to one liter of absolute ethanol containing 204 grams of sodium ethoxide. After filtering off sodium chloride which precipitates 160 grams of dry diethyl malonate are added to the clear filtrate and the resulting mixture is heated under reflux for two hours and allowed to stand overnight at room temperature in a closed vessel. The precipitated reaction product is recovered by filtration, dissolved in water, acidified, and collected again on a suction filter. After washing with small portions of ice-cold water the solid 2-$\beta$-hydroxyethyl-4,6-dihydroxypyrimidine recovered is dried.

2-$\beta$-methoxyethyl-4,6-dihydroxypyrimidine 138.5 grams of $\beta$-methoxypropionamidine hydrochloride are reacted with 204 grams of sodium ethoxide dissolved in one liter of absolute ethanol. The sodium chloride formed is insoluble and precipitates. After removing the sodium chloride by filtering, 160 grams of dry diethyl malonate are added to the clear filtrate, and the reaction mixture is heated under reflux for two hours following which it is allowed to stand overnight. A solid product precipitates and is collected on a suction filter. This solid is dissolved in water and the solution is acidified to precipitate 2-$\beta$-methoxyethyl-4,6-dihydroxypyrimidine which is then recovered by filtration, washed with cold water, and dried.

It will be apparent from the foregoing preparations that by substituting an equivalent amount of the appropriate amidine hydrochloride for the amidine hydrochloride compounds employed in these preparations any of the 4,6-dihydroxy-pyrimidine compounds from which are derived our new monoazo dyes are readily prepared. Thus by treating 108.5 grams of propionamidine hydrochloride in accordance with this procedure 2-ethyl-4,6-dihydroxypyrimidine is formed and recovered. Similarly, when 138.5 grams of γ-hydroxybutyramidine hydrochloride are reacted according to this procedure, 2-γ-hydroxypropyl-4,6-dihydroxypyrimidine is recovered.

Amidine compounds employed to produce the 4,6-dihydroxypyrimidine compounds mentioned hereinbefore are prepared according to well-known procedures. The most common of these procedures is described in detail for the preparation of acetamidine in Organic Syntheses (Collective Volume I compiled by Gilman and Blatt). The method comprises treating the nitrile with an equimolar amount of absolute ethanol and dry hydrogen chloride to form the imino ether hydrochloride. This is then reacted with an anhydrous solution of ammonia in ethanol following which the amidine is recovered by filtration. The procedure is illustrated by the preparation of β-methoxypropionamidine hydrochloride as follows:

To 145 cc. of absolute ethanol are added 208 grams of dry β-methoxypropionitrile. Dry hydrogen chloride gas is then passed into the resulting solution until a gain in weight of 95 grams is recorded. The reaction vessel is tightly stoppered and allowed to stand for two or three days at room temperature. 450 grams of a 10% solution of dry ammonia in absolute ethanol are then added, and the reaction mixture is again stoppered and allowed to stand at room temperature for two or three days or until precipitation of the reaction product appears to be complete. Solid β-methoxypropionamidine hydrochloride is recovered by filtration, recrystallized from dilute hydrochloric acid, if desired, and dried.

By substituting 242 grams of β-ethoxypropionitrile for the β-methoxypropionitrile in the foregoing example β-ethoxypropionamidine hydrochloride is prepared. By substituting 173 grams β-hydroxypropionitrile, β-hydroxypropionamidine hydrochloride is prepared. By substituting 208 grams of γ-hydroxybutyronitrile, γ-hydroxybutyramidine hydrochloride is prepared. By substituting 208 grams of β-hydroxybutyronitrile, β-hydroxybutyramidine hydrochloride is prepared.

The azo dye compounds of our invention can be applied to the coloration of fabrics made of or containing cellulose alkyl carboxylic acid esters such as cellulose acetate by the known dyeing or printing methods. In accordance with the known dispersion method of dyeing, the azo dye is first ground to a fine paste in the presence of a suitable dispersing agent folowing which the paste is dispersed in water or a dilute solution of soap in water to form the dye bath. The textile material is then immersed in such a dye bath in accordance with known procedures. Suitable dispersing or solubilizing agents include soap, sulforicinoleic acid, the alkali metals salts or sulforicinoleic acid, sulfonated oleic, stearic, or palmitic acid or salts thereof, such as the sodium or ammonium salts. For printing, our new dyes are advantageously ground with a suitable dispersing agent, such as a sodium lignin sulfonate and the resulting printing mixture is then applied to the textile material, in accordance with known printing methods.

We claim:

The azo dye compound having the formula:

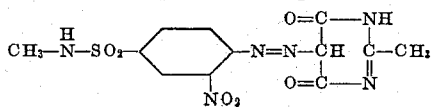

JOSEPH D. DICKEY.
JAMES G. McNALLY.

REFERENCES CITED

The following references are of record in the file of this patent:

UNITED STATES PATENTS

| Number | Name | Date |
| --- | --- | --- |
| 2,140,987 | Dickey | Dec. 20, 1938 |
| 2,224,144 | Dickey et al. | Dec. 10, 1940 |
| 2,231,706 | Dickey | Feb. 11, 1941 |

OTHER REFERENCES

B. Lythgoe et al.: Jrl. Chem. Soc. (London) Part II, pages 315–317 (1944).